Dec. 19, 1967 W. LENZ ET AL 3,358,623
METHOD AND APPARATUS FOR HEAT AND CHEMICAL RECOVERY FROM WASTE LIQUORS
Filed June 24, 1965 3 Sheets-Sheet 1
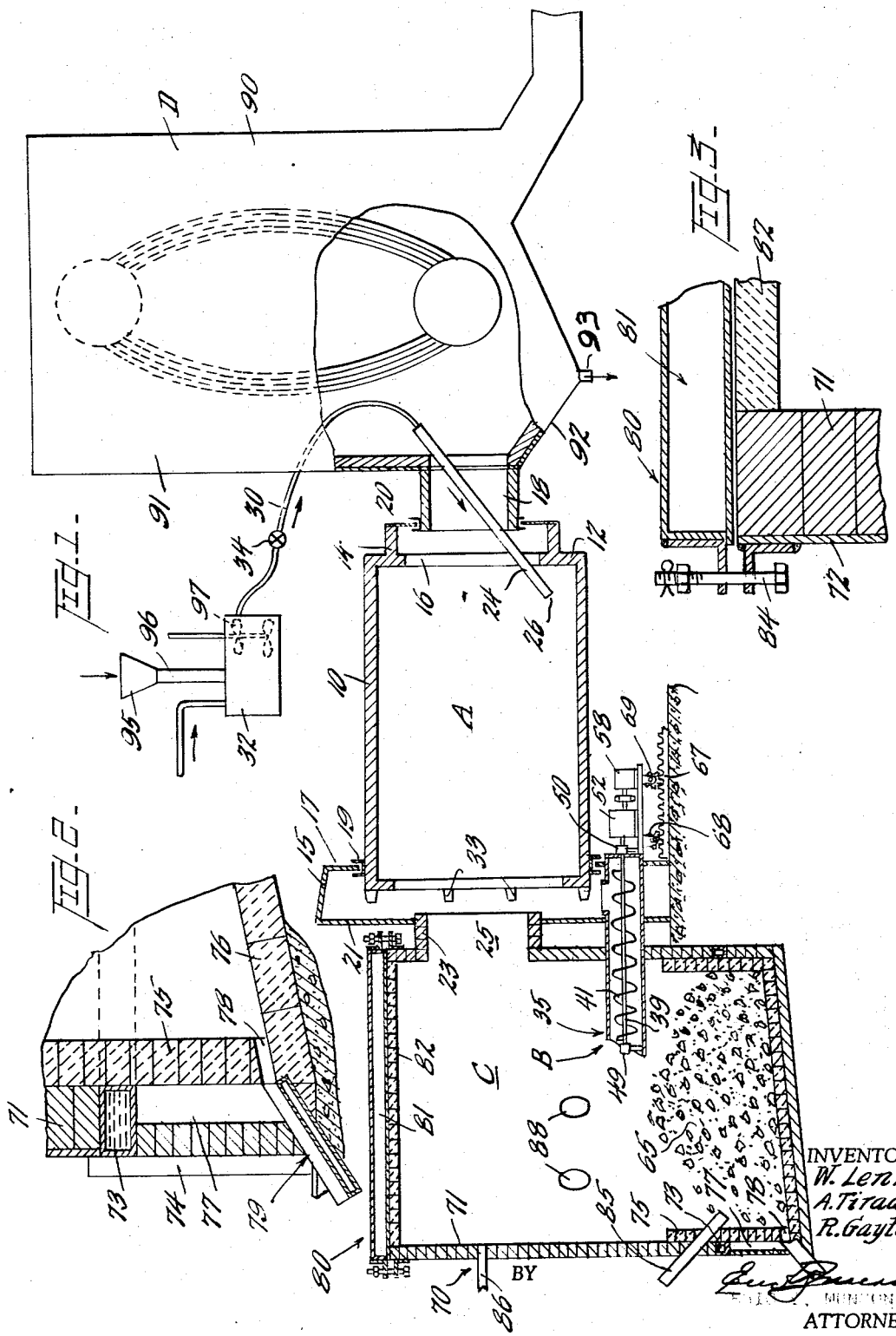
INVENTORS
W. Lenz
A. Tirado
R. Gaytan
ATTORNEY

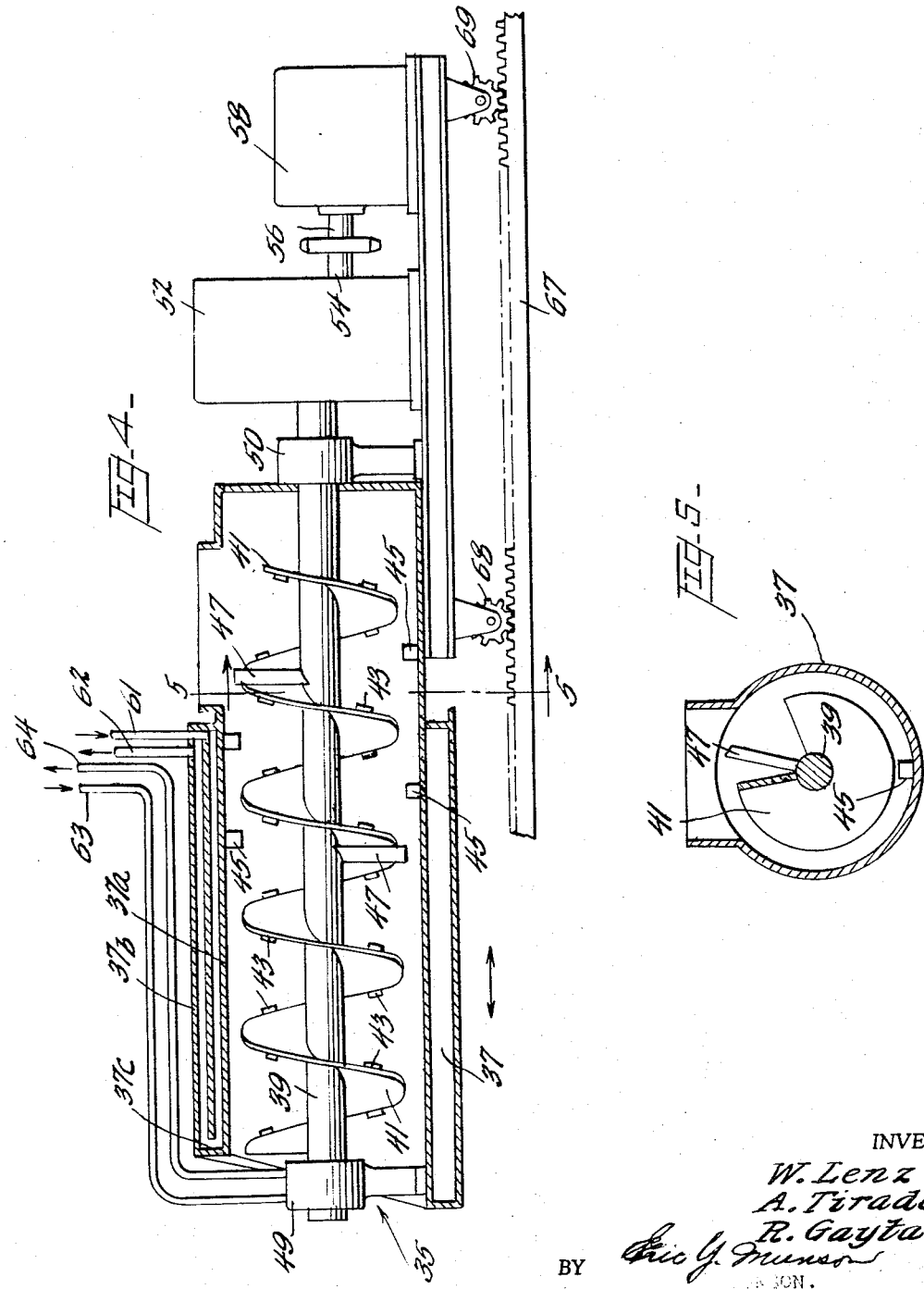

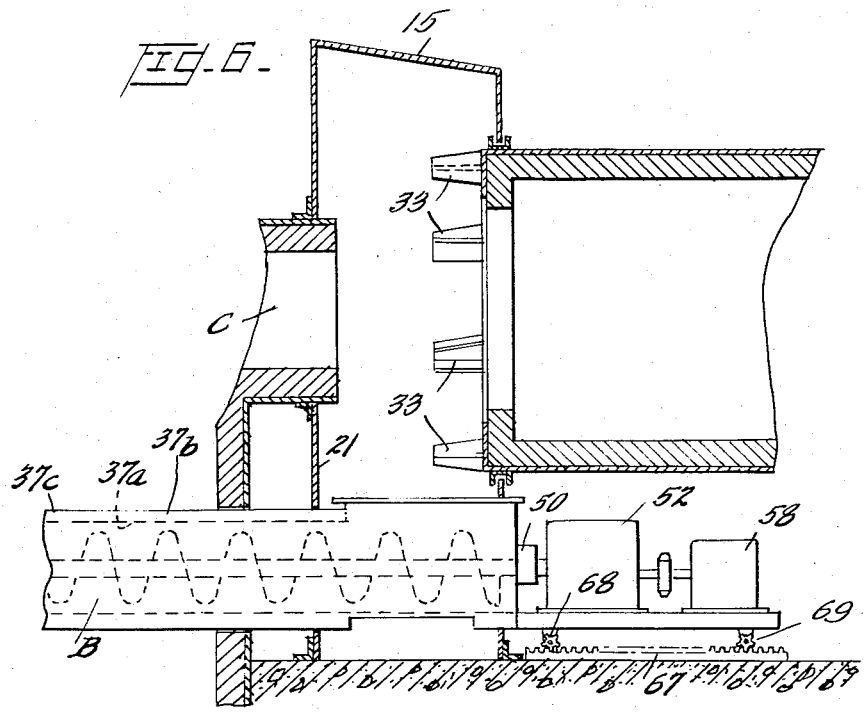
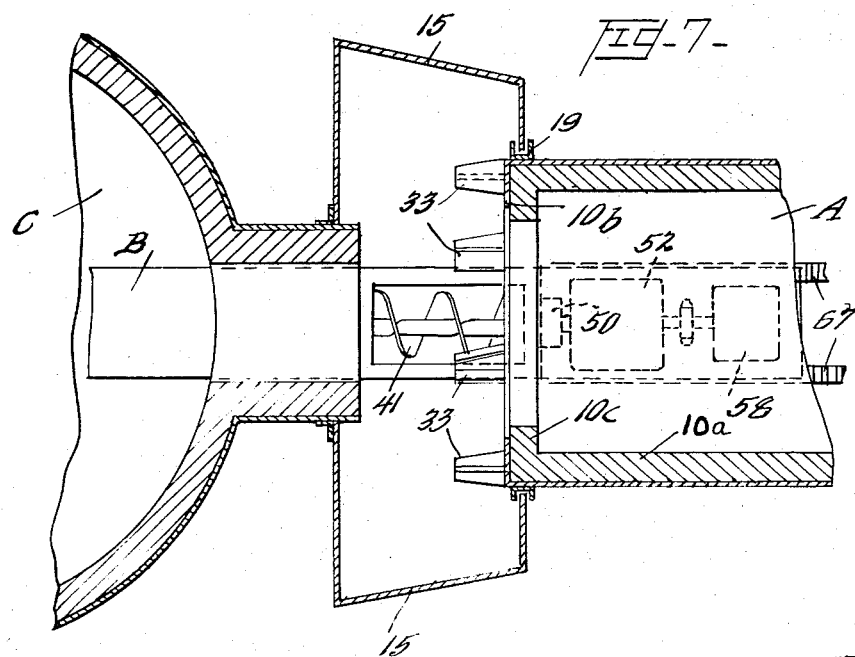

United States Patent Office 3,358,623
Patented Dec. 19, 1967

3,358,623
METHOD AND APPARATUS FOR HEAT AND CHEMICAL RECOVERY FROM WASTE LIQUORS
Walter Lenz, Adalberto Tirado, and Rafael Gaytan, Mexico City, Mexico, assignors to Fabricas de Papel Loreto y Pena Pobre, S.A., Mexico City, Mexico, a corporation of Mexico
Filed June 24, 1965, Ser. No. 466,781
24 Claims. (Cl. 110—10)

ABSTRACT OF THE DISCLOSURE

Method and apparatus for recovering inorganic chemicals, and for utilizing the heat values of organic compounds, contained in waste liquors obtained in production of chemical and semi-chemical wood pulp.

The waste liquors are delivered to a drying zone comprising a rotating cylindrical drum or shell, where the liquors are dried and from which the dried material is discharged more or less in the form of discrete lumps or aggregates. The dried material discharged from the drying zone is fed to a separate, stationary combustion zone through a feed unit wherein the material is transformed into the form of lumps of controllable size. The drying in the drying zone is effected by gaseous products of combustion of organic compounds, these products of combustion being derived from the aforementioned combustion zone into which primary air is fed, so as to effect combustion of organic compounds and formation of a smelt of the inorganic material contained in the lumps of the solids. The gaseous products of combustion are discharged into a heat recovery zone separate from the combustion zone, and are there utilized for generating steam.

---

This invention relates to improvements in method of and apparatus for recovering inorganic chemicals, and for utilizing the heat values of organic compounds, contained in waste liquors, particularly waste liquors obtained in the production of pulp by chemical and semi-chemical processes of cooking or digesting wood and other plant materials.

More specifically, the invention is concerned with an improved system for recovering inorganic chemicals from the solids dissolved, suspended, entrained or otherwise contained in waste liquors of the character above-mentioned, and at the same time, to utilize the heat value of organic compounds contained in such solids, especially for utilizing such heat value to generate steam.

The process and apparatus of the invention have particular utility and advantages for recovering inorganic chemicals and utilizing the heat values of organic matter contained in waste liquors obtained in the manufacture of pulps from wood, sugar cane bagasse and other cellulosic plant material, by the well-known chemical or semichemical processes of cooking or digesting wood chips or the like. The principal ones of such processes are those generally referred to as the neutral sulfite, acid sulfite, and soda or sulfate processes.

It is known to treat waste liquors of the aforementioned character for the recovery of inorganic chemicals and for utilizing the heat values of organic compounds contained therein. The most conventional system utilizes recovery boilers or units to generate steam by the heat of the gasses evolved from the furnace in which the dried solids portion of the liquor is burned. These systems, however, have proved to be unsuitable and, indeed, impractical, for small scale operations. By "small scale operations" is here meant such recovery systems as are required for or confined to the treatment of waste liquors from a pulp mill having a production capacity of an order less than 100 tons of pulp per day.

In such small scale operations, the conventional recovery boilers or units become too expensive. Furthermore, the conventional types of recovery boilers or units exhibit physical limitations which prevent or impede them from operating at high efficiency. Still further, these conventional units introduce other substantial problems in their operation when utilized for treating waste liquors in which the proportion of organic material to inorganic material is low. These problems arise, in such instances, from low heat value of the solids by reason of their relatively low content of organic material. As a result, the recoverable heat values are inadequate for properly drying the liquor and burning the dried solids.

In some systems, rotary kilns have been used for the drying of the liquor and for the calcining of the resultant solids, the calcined solids or so-called black ash being leached as they are discharged from the kiln. Such rotary kilns, however, render difficult the complete burning of the organic material contained in the solids, because of the poor contact that exists between the mass of solids resting at the bottom of the rotary kiln, and the mass of gases flowing on the top thereof. Consequently, it frequently becomes necessary to utilize a large excess of air to improve the contact between the gases and the solids. As a consequence, the temperature of the gases discharged from the kiln and passed to the heat recovery boiler is substantially reduced, resulting in a corresponding reduction in the amount of heat absorbed by the boiler for the generation of steam. Thus, the economy of the process is adversely affected to a very substantial extent.

It is also known to utilize calcining or smelting furnaces for the dried solids, separate from the dryer in which the spent or waste liquors are dried, and from which the dried solids are fed to the furnace. In these systems, the walls of the smelting furnaces are necessarily constructed of the least costly materials, such as plain concrete, inasmuch as the high temperatures prevailing in the melting zone causes rapid destruction of the furnace walls in the areas adjacent the bottom thereof. Also contributing to the destruction of the furnace walls are the influences of chemical reactions, the direct stresses due to the weight of the upper part of the walls, the erosion produced by the primary combustion air, the temperature differentials or gradients within the walls, etc. The effects of these influences become intensified, as will be appreciated by those skilled in the art, under the high temperatures prevailing in the furnace. Hence, unless special precautions are taken, the destructive action is so intense that major repairs and even the complete rebuilding of the entire furnace are required at frequent intervals. The foregoing difficulties are especially burdensome in the case of pulp mills of small capacity, e.g. 100 tons, or less, of pulp per day, for the reason that they customarily are shut down every week-end. As a result, the aforementioned destruction of the furnace walls, occurs more readily or frequently, owing to the rapid and wide changes of temperature in the furnace by reason of the weekly shut-down and start-up of the mill operation.

Efforts heretofore made to overcome the aforementioned difficulties attending the use of smelting furnaces have involved the use of furnaces whose entire walls are water-cooled. The walls of such furnaces manifestly are not provided with any brick or similar lining, since the latter would readily break up by the large temperature difference or gradient. Besides, the water-cooling of the walls of such furnaces absorbs large quantities of the heat in the furnace, thus leaving very little heat in the combustion gases which can be used for the generation of steam. Since the amount of steam that would be generated in mills utilizing such smelting furnaces hardly justifies the investment required for the installation of a boiler as a part of the system, these mills generally dispense with it and produce no process steam.

In some mills utilizing furnaces of the type having water-cooled walls, part of the tubes of a heat recovery boiler, interposed between the furnaces and the dryer or evaporator for the liquor, are diverted so as to serve as cooling means for the walls of the furnace. However, not only are such boilers of rather unconventional design, but since it is necessary in such installations that the pressure parts of the boiler be localized at both ends of the dryer, these boilers are necessarily inordinately expensive.

The aforementioned difficulties and objections attending the use of systems in which various of the combinations of dryers, rotary kilns and smelting furnaces are employed, have resulted in such systems being discarded or considered obsolete, to the extent that now practically all pulp mills use conventional heat recovery boilers or units in a system in which the steps of concentrating and drying the spent liquor, and burning or calcining the dried solids take place simultaneously in heart of the boilers.

However, in the use of such conventional recovery boilers in the foregoing manner, it becomes necessary to compromise between the width, length, height, etc., of boilers if it is to operate at a high efficiency for the drying and the burning of the solids (including the necessary chemical reactions) and for the absorption of the heat to generate steam. As a result, there is a limit to the smallest size of unit which may still operate economically. Though smaller units have been installed in several instances, they are expensive and in actual practice are not very efficient in operation.

Furthermore, these conventional recovery units do not function effectively for the treatment of spent liquors from high yield pulps, or from those obtained in the cooking of plant material such as sugar cane bagasse or straw. The inability of the system to function effectively in such instances is due either to the low heat value of those liquors or to the low solids concentration and small quantity of liquor delivered from the cookers or digesters. Consequently, many pulp mills of rather small capacity deem it to be more expedient simply to discard their liquors by discharging the same to sewage, notwithstanding the fact that the value of the chemicals and of the heat potential thereby discarded amounts to a substantial figure.

The principal object of the present invention, accordingly, is to provide an improved method of and apparatus for the recovery of the heat values and chemicals of waste liquors, particularly the spent liquors obtained in the cooking or digesting of wood and other plant materials for the production of fibrous pulp.

A more particular object of the invention is to provide an improved method and apparatus as aforesaid and of a character such as not only will afford a number of significant advantages in connection with the operation of large size pulp mills, but which is particularly adaptable for use in pulp mills of much lower capacity, as low as ten tons of pulp per day, or even less.

Thus, it is an important characteristic and advantage of the invention that the investment necessary for installing the system, and the cost of operating the same in pulp mills producing less than 50 tons of pulp per 24 hours, are sufficiently low to justify the installation and operation of the system in areas of the world, particularly in the under-developed regions of Africa, the Near East and Latin America, where the customary size pulp mills are not justified at the present levels of economy of such areas.

A particular feature of the invention is that it provides a recovery system as aforesaid, wherein each step thereof operates satisfactorily and efficiently, and may be controlled according to the conditions prevailing therein.

Still another object of the invention is to provide a recovery system as aforesaid, which lends itself to use for the recovery of heat values and chemicals from waste liquors containing low ratios of organic to inorganic matter, equally as well as to the recovery thereof from waste liquors containing normal ratios of organic to inorganic matter.

Yet another object of the invention is to provide a system of the character aforesaid, wherein the rate of primary combustion may readily be controlled by converting the dried solids portion of waste liquors into the form of lumps and controlling the size in which these lumps are fed to the combustion zone.

It is a feature of the invention that the waste liquors are delivered by gravity to the drying zone, thus enabling extraneous solid or viscous material to be mixed with the liquor prior to delivery into the drying zone. Accordingly, it is an advantage of the invention that it makes possible the admixing of extraneous solid, viscous or liquid organic waste material of very low cost, such as sawdust, pith of sugar cane bagasse, tree bark, petroleum derivatives or other organic liquor wastes, with the waste liquor to be treated, in order to derive the heat value of the added waste material, thereby to enhance the operation.

Yet another object of the invention is to provide a recovery system as aforesaid, and which enables high rates of chemical reduction to be obtained in the chemical reactions, such as for the conversion of sodium sulfate into sodium sulphide.

Still another important object of the invention is to provide a system as aforesaid, which is safe and simple in operation, and which readily lends itself to being automated to the extent that only one operator is required to attend and oversee the entire operation.

Other objects and advantages of the invention will be more readily apparent from the detailed description set forth herebelow, and from the accompanying drawings, in which:

FIG. 1 is a diagrammatic view, partly in section, and with parts broken away, illustrating an embodiment of apparatus which may be utilized in the practise of the invention;

FIG. 2 is an enlarged fragmentary view, showing the construction at one of the lower ends of a smelting furnace constituting one unit of the apparatus shown in FIG. 1;

FIG. 3 is a similar view, showing the construction of the top of the smelting furnace of FIG. 1;

FIG. 4 is a view, partly in cross-section, showing an embodiment of feeding mechanism utilized in the practise of the invention, for feeding dried solids of the waste liquors from the drying unit of the apparatus to the smelting furnace shown in FIG. 1; and FIG. 5 is a view in cross section, taken along line 5—5 of FIG. 4; and FIGS. 6 and 7 are enlarged fragmentary views, respectively in side elevation and in top plan, of the drying unit, feeding mechanism and smelting furnace.

Referring to FIG. 1 of the drawing, the apparatus there shown for practising the method of the invention comprises, in general terms, a unit A for drying the waste liquor fed thereto in preconcentrated form; a furnace unit C for burning or calcining the dried material fed thereinto from unit A; a feed unit B for transforming the dried material discharged from unit A into the form of lumps of a size controllable as hereinafter more fully described, and for feeding the lumps into the furnace; and a heat recovery unit D for generating steam by aid of the residual heat of the gaseous combustion products discharged from unit C after they have been utilized for drying the material in unit A.

UNIT A

The drying unit A comprises, in general terms, a cylindrical drum 10, having a refractory lining 10a on the interior, the drum and lining being each formed with an annular flange 10b, 10c, at the ends thereof. The drum 10 is suitably mounted for rotation on an axis inclined downwardly at a slight angle from its inlet end 12 to its discharge end 13, and driven from any suitable source of power through a variable speed drive (not shown) coupled to the drum as by means of a toothed annular ring 14 affixed to the drum. The drive may thus be varied so that the peripheral speed of rotation of the drum may be adjusted to discharge the dried material from the drum more or less in the form of discrete lumps or aggregates.

The opening 16 of the drum leads to a tubular passageway 18 formed at the lower end of the heat recovery unit D hereinafter more fully described. Provision to prevent the escape of gases between opening 16 and passageway 18 is preferably in the form of a labyrinth seal encircling the wall of passageway 18 as indicated by reference numeral 20.

The discharge end 13 of the drum is disposed within an annular hood 15, desirably in the form of a frustoconical cylinder. The inner wall 17 of the hood is disposed so as to constitute one wall of a labyrinth seal 19 encircling this end of the drum, and the outer wall 21 of the hood encircles the outer surface of the wall 23 of a tubular passageway 25, extending from the furnace unit C adjacent the upper end thereof.

For delivering the pre-concentrated waste liquor to the drying unit A to be treated in accordance with the invention, a water-cooled pipe 24 is mounted so as to extend angularly downwardly through opening 16, its lower end 26 terminating inwardly of wall 12 adjacent the bottom of drum 10, and at a level slightly higher than the periphery of the flange 10c at the discharge end 13 of the drum. The outer end 28 of the pipe is connected to the outlet end of a conduit 30 leading from a supply tank 32 mounted a considerable distance above the drum, and provided with a feed control valve 34. Conduit 30 is preferably connected with tank 32 as a point adjacent the upper part of the latter, in order to be able to deliver a uniform mixture of the liquor with any solids that may be introduced into tank 32, as hereinafter referred to.

For pushing the dried solids discharged from unit A into the feeding unit B and automatically removing such of these solids as might otherwise collect in the space around the end of the cylinder 10 extending into hood 15, there are fixed to the flange 10b at the discharge end of the cylinder, a series of rakes 33. As more clearly shown in FIGS. 6 and 7, the rakes 33 each comprises two small pieces of steel plate of trapezodial outline, welded together so as to extend in planes at a right angle to one another.

UNIT B

In accordance with one feature of the invention, the feed of the dried material from unit A to the smelting furnace C is achieved by a feed unit comprising, in general terms, a water-cooled screw feeder 35. The feeder, as more fully shown in FIGS. 4 and 5, comprises a hollow wall, cylindrical shell 37 composed of concentric pipes 37a, 37b, mounted so as to project through the adjacent vertical wall of the furnace unit C and to extend horizontally a variable distance into the furnace unit. The annular space between the two pipes provides a jacket 37c for circulation of cooling water therethrough. This cooling section normally extends over that portion of the feeder disposed between the wall 21 of hood 15 and the end of the feeder which projects inside unit C.

Extending axially through the interior of pipe 37a is a rotatable shaft 39 on which is mounted a helical screw 41, each of the several flights of the screw having bars 43, each of about 2 inches thickness, welded to the opposite surfaces thereof, for a purpose to be referred to herebelow. To the latter end also, the inner surface of pipe 37a and the peripheral surface of shaft 39 are provided, adjacent the inlet end of the feeder, with radially extending bars 45, 47, respectively, each of these being about 2 inches by ¼ inch, and about six inches long, and being spaced from one another at about eight inch centers and intermediate the path of the flights of the screw.

Shaft 39 rotates in bearings 49, 50 at the opposite ends thereof, and extends through the bearing 50 for coupling to a variable speed drive 52. As will be seen more clearly from FIG. 7, bearing 50 and variable drive 52 are disposed exteriorly of wall 17 of hood 15. The drive 52 has its input end 54 coupled to the output shaft 56 of motor 58. Thus, the rotational speed of the screw 41 may be regulated so that it properly performs its function, hereinafter more fully described, on dried solids of different characteristics discharged from dryer unit A.

The annular space or jacket 37c is suitably connected with inlet and outlet pipes 61, 62, respectively, for conveying cooling water into and out of the jacket. Similarly, bearing 49 is jacketed for cooling the same with water, admitted thereto and discharged therefrom through pipes 63, 64, respectively.

In accordance with another feature of the invention, the position of the feed unit B, relative to the furnace unit C, is adjustable so as to enable the solids material fed by unit B to be discharged into the furnace at any desired place along the bottom or so-called pot portion 65 of the furnace, viz., the portion thereof in which primary combustion and calcination of the solids and resultant chemical reactions occur. As indicated in FIGS. 4 and 6, the position of the feeder unit may be adjusted by means of a rack 67 fixed so as to extend lengthwise of and parallel to the axis of shaft 39. Electrically driven, spaced pinions 68, 69 are fixed to the outer surface of the shell for coaction with the rack 67. Thus, the position of the feeder may readily be varied so that it discharges the solids at any desired place along the pot portion of the furnace, as above stated, or if desired, to remove the same entirely from its position within the interior of the furnace, as may sometimes be necessary.

With the foregoing objective in view, the rear or inlet portion of the shell 37 extends through an opening in outer wall 21 of the hood 15, so that it may be actuated for reciprocal movement by the rack 67 and pinions 68, 69.

UNIT C

This unit, in accordance with the invention, comprises a stationary smelting furnace indicated generally by reference numeral 70, having the upper portion of its vertical cylindrical wall built of clay firebricks or the like 71, retained in place by an outer shell 72, preferably of carbon steel.

As best shown in FIG. 2, these upper wall portions are supported on a hollow ring 73, resting on a supporting column 74 and being connected with means for feeding water or air to the interior thereof to serve as a cooling medium.

The lower portion of the wall is lined interiorly thereof with basic refractory bricks or other material 75 of a character which may readily be repaired or replaced when this becomes necessary as a result of the physical and chemical actions which take place in the furnace.

The lining 75 extends from a point above the location of the feed of primary combustion air into the furnace, down to its juncture with the inclined floor 76 of the furnace.

The cooling ring 73 serves to eliminate the direct or compressive stress on the inner lining 75 and to cool the inner lining in the very areas thereof which would be the more susceptible to the above-mentioned destructive actions in the absence of such cooling and stress relief. Additionally, the air or water cooled ring 73 provides an air chamber 77 at the lower part of the furnace, the air serving as an efficient and cheap insulating medium.

Also, in instances where air is employed as the cooling medium in ring 73, the thereby preheated air may be used as primary or secondary air for the combustion zone of the furnace, thus recovering the heat value of the preheated air.

If desired, additional similar water or air cooled rings may be positioned at higher levels along the wall portions to assist in supporting the same, when the walls are of larger height, or to increase the stiffness of the upper wall portions.

The so-called smelt (consisting essentially of a melted mixture of the inorganic solids components, such as sodium carbonate, etc., recovered from the starting liquor) is discharged from the furnace through an opening 78 formed at the lowermost end of the lining 75 at the side thereof which is joined to the lower end of the inclined floor of the furnace. The opening 78 extends at substantially the same incline as does the floor 76 and leads into a spout 79 comprising a pair of spaced, concentric semi-cylindrical steel pipes to provide for water-cooling the open channel constituting the spout. The spout is disposed in the space between the lining 75 and supporting column 74, for final discharge of the smelt into a suitably lined receiving tank for dissolving the same.

The top wall 80 of the furnace is preferably in the form of a hollow water-cooled cover 81, lined on the bottom surface thereof with suitable cementitious brick or the like, 82.

Although the above-described construction of the furnace is such as to minimize the danger of explosion, it is preferred nevertheless to provide for vertical movement of the top 80 in response to unusually high expansive forces which may occur within the furnace. Accordingly, the top is mounted to be moveable along and guided by suitably spaced vertical guide bolts 84, secured in position exteriorly of the walls, adjacent the periphery of the top. Hence, damage to the equipment is avoided in the event such forces reach an explosive level.

Primary combustion in the lower or so-called pot zone of the furnace is provided by primary air fed into this zone of the furnace from any convenient source (not shown) through water-cooled nozzle 85 extending through the furnace wall and lining 75 at locations above the cooling ring 73. The nozzles extend at a downward inclination so as to introduce the air at a level approximating that of the cooling ring 73, so that the cooling action of the ring will counter-act erosion of the lining 75 by the primary air. At the same time, the primary air is thus introduced well under the top of the bed of dry solids which practically fills the bottom or pot zone of the furnace.

Secondary air is introduced into the upper zone of the furnace, well above the pot zone, by means of nozzles 86 extending through the upper part of the furnace wall.

Formed in the wall of the furnace, at convenient locations above the upper end of lining 75, are several inspection openings 88, each provided with a suitable closure. Each of the openings serves not only for inspecting the condition of the refractory lining 75, but also for enabling a tool, such as a spray gun, to be operated through the openings for applying refractory material to the interior surface of the furnace wall. Thus, there is no necessity for an operator to enter the furnace for making such repairs, and hence there is no necessity for cooling down the furnace for that purpose. Consequently, a repair job which ordinarily requires several days shut-down of other type furnaces, may be completed within a few hours.

As will be evident, the gases and the heat produced by the combustion of the organic matter contained in the dried solids charged into the furnace from dryer unit A, pass out of the furnace through the opening 25 and into the dryer for drying the pre-concentrated liquor fed into the latter. The gases and the heat pass from the dryer through opening 16 into the passageway 18 leading to the heat recovery unit D.

UNIT D

This unit may comprise any conventional form of steam boiler 90 of a capacity appropriate to the capacity of the drying and calcining units. As illustrated in FIG. 1, the boiler may be a water tube boiler of standard design. However, since in the normal operation of the apparatus according to the invention, combustion occurs to a certain extent even beyond the dryer unit A, the boiler 90 may be preceded by a secondary combustion chamber 91. To facilitate the removal of ashes formed in this secondary combustion chamber, the floor 92 thereof is sloped downwardly so as to enable the ashes to be readily removed from time to time, as through a discharge opening 93.

As already indicated, it is one of the distinct advantages of our invention that the heat recovery unit for the generation of steam does not require a boiler of any special design, and that any conventional form of water tube boiler may be utilized. So long as the boiler is situated at a considerable distance from the hot zone of the smelting furnace (unit C), the danger of any explosion occurring is very greatly minimized.

*Operation*

In carrying out the invention, the pre-concentrated waste liquor, fed into tank 32 through a conduit 100, is fed by gravity into the rear of the drying drum 10 by way of the water-cooled pipe 24. The liquor is dried in the drum by the action of the hot gases discharged from the furnace unit and moving countercurrently through the drum, and by the rotation of the drum. Solids carried over by the gases emitted from the furnace are partially settled in the drying drum.

The rotary speed of the drying drum 10 may be adjusted by the variable speed drive so as to provide a peripheral speed within the range of about 20 to 40 feet per minute. The peripheral speed affects the rate of drying as well as the physical form of the dried solids discharged from the drum.

At the forward end of the drying drum, the dried material is pushed out therefrom by the rakes 33 and into the rear of the screw feeder 35 for feeding the same to the smelting furnace. As above-indicated, the feeder is coupled to a variable speed drive in order that it may serve its intended purposes when operating on solids of different characteristics. For that purpose, the shaft 39 should rotate at 20 to 60 r.p.m. In being moved forwardly through the feeder by the rotary screw 41, the bars 45, 47 extending radially from the shell and the shaft, respectively, and the smaller bars 43 on the flights of the screw, transform the moving dried solids into lumps of the appropriate shape and size to be properly burned by the primary air in the smelting furnace. In other words, the rate of drying in drum 10, together with the rate of rotation of the screw 41 and the action of the bars serve to condition the dried solids so that they do not consist either of dusty material or of lumps or rolls too large in size for proper burning conditions to be maintained. To that end, the size of the lumps preferably should be about 3 inches to 6 inches. Lumps which are too small may clog or plug up the pot zone of the smelting furnace and disturb the desired distribution of the primary air therethrough while lumps which are too large present a minimum surface area for contact with the combustion air. In either instance, the rate of primary combustion is upset or improper, with the result that the recovery of the heat and chemicals is diminished.

In feeding the lumps of dried solids to the smelting furnace 70, the position of the feeding unit B in relation to the vertical axis of the furnace may be adjusted so that the lumps will be discharged from the feeder into the desired part of the pot zone of the furnace. In this manner, the operator may readily prevent the primary air from escaping through the pores or spaces in the bed of solids being burned in the furnace. As above indicated, the reciprocal movement of the screw feeder may be achieved by means of rack 67 and pinions 68, 69. Thus, the operator may readily effect such movement when necessary or desired. Likewise, if and when necessary, the screw feeder can be entirely removed from within the furnace.

In the operation of the furnace unit, the primary combustion, calcination and reduction reactions are effected in the bottom or pot zone 65 of furnace 70, where a bed or mound of solids is maintained, so as to practically fill the pot zone.

Primary air, amounting to from 10 to 25% of the total air requirement, is introduced into the furnace well under the top (about four to five feet) of the bed of dry solids, through the nozzles 85. This, together with fact that the pot zone of the furnace is very hot, results in a high rate of efficiency in the chemical reduction of the inorganic compounds obtained by the burning or calcination of the dried solids delivered to the furnace. Thus, in the case of the reduction of sodium sulphate to sodium sulphide, the efficienly is as high as 90 to 95%. Other inorganic compounds may be reduced at correspondingly high efficiency rates.

The chemical reactions which take place in the pot zone as will be understood by those skilled in the art, will depend upon the material being treated. Thus, in the burning of dried solids of black liquor obtained in the soda or kraft process, the reactions in the pot consist essentially of the reduction of sulphate salts to sodium sulphide, and the burning on organic matter to produce heat, sodium carbonate and combustion gases containing $CO_2$, $SO_2$, $H_2O$, etc.

As above indicated, one of the important features of the present process resides in its capability of handling liquors containing solids of low heat value, as is the case with liquors obtained in the production of so-called high yield pulps or from those obtained in the cooking of fibrous material such as straw, sugar cane bagasse, etc. In such instances, the liquors may, in accordance with the present invention, be mixed with inexpensive waste fuels, or with organic waste solids such as sawdust, tree bark, pith of sugar cane bagasse, etc., to increase the ratio of organic to inorganic matter and thereby the heat value thereof. When utilizing such organic wastes for the foregoing purpose, the problem of disposal of the waste is obviated and the heat value thereof is simultaneously recovered for generating steam.

The use of such inexpensive solid fuels or organic waste solids is of particular advantage in the treatment of liquors obtained in procedures utilized for producing high yield pulps from soft woods, hard woods, sugar cane bagasse, etc. In such procedures, the chemical demand in the cooking is low. Hence, considerably less solids are present in the waste liquors than in those obtained in producing pulps by conventional cooking or digesting procedures. The heat required for adequately concentrating the highly diluted liquors obtained in the aforementioned procedures therefore induces most pulp mills utilizing such procedures to discard the liquor to sewage, notwithstanding the fact that the content of organic and inorganic compounds of the liquors are of substantial chemical and heat value. In accordance with the invention, the chemical and heat values of such diluted liquors may be recovered by mixing the same with organic waste solids such as those mentioned above, or with other inexpensive fuels, such as petroleum derivatives or other liquid organic wastes, and they drying such mixtures, followed by the burning of the dried solids in the manner herein described. Accordingly, the diluted waste liquor does not require evaporation to a high solids content, and yet the heat value of the cheap fuel mixed therewith and the organic portion of the solids of the liquor may be advantageously utilized for generating steam in the same boiler.

In the case of the recovery of the chemical and heat values of waste liquors obtained in the production of pulp from sugar cane bagasse, it is necessary to screen out or otherwise remove the pith contained in the raw bagasse in order that the pulp shall possess good paper-making properties. This pith usually has no value to the mill, and its disposal constitutes a considerable problem. The use of such pith in the practice of the invention, in the manner above set forth, accordingly constitutes a substantial advantage and saving, especially when considering that the pith in sugar cane bagasse amounts to from about 20 to 30% by dry weight, and has no value for pulp making.

It is essentially for the reasons pointed out above, that in some sugar mills the bagasse is not considered economically suitable for use in making pulp, but is burned to make steam.

In the practice of the invention with the use of extraneous inexpensive fuel such as the organic waste solids of the type indicated, they may be mixed with the liquor by delivering them to tank 32 from a hopper 95 discharging into feed pipe 96. In tank 32, the liquor and the added solids may be mixed by agitation as by one or more rotary mixing blades 97 suitably mounted in the tank.

The ability to handle such mixtures of waste liquors and solid fuels in the practice of the invention stems largely from the fact that in the process hereof the starting liquor is fed by gravity to the drying unit A, rather than by spraying the liquor through nozzles or orifices of one sort or another, as is the case in the conventional processes. Furthermore, the gravity feed of the liquor to the drying unit is through a water-cooled conduit whose diameter may be of any selected dimension. Consequently, solid material added to the liquor and thus fed in admixture therewith to the dryer, proceeds through the drying unit A, the feeder unit B and the smelting furnace, acting the same as though it were a part of the organic material originally contained in the unmixed liquor. Moreover, by reason of the variable rotational speed of the drying drum, its peripheral speed may be adjusted according to the type of liquor or admixture of liquor and solid fuels fed into the dryer, and the retention time or drying rate thereby controlled.

In general, the peripheral speed of the drying drum will be within the range of about 20 to 40 feet per minute.

The aforementioned control of residence time or drying rate of the material as it moves through the drying drum is likewise of advantage in the drying and burning of unusual liquors of the general type herein referred to, or of liquors that are too dilute to be processed in the systems heretofore used.

In any case, the dried solids are continuously fed by unit B from the rotary dryer into the smelting furnace 70 as above set forth.

As pointed out above, it is another advantage of the invention that a fully automatic operation may be achieved. This may be obtained by setting a constant flow of primary and secondary air into the furnace, and controlling the entrance of liquor into the rotary drying drum, in response to, and utilizing as the signal therefor, the temperature of the gases in the secondary combustion chamber 91. The latter temperature may at the same time be used to control an automatic feeding device for organic wastes that may be utilized as supplementary fuel, in admixture with the liquor, as referred to above.

As an illustrative embodiment of the invention, reference will now be made to the recovery of inorganic chemicals and the heat value of organic solids contained in black liquor obtained in the production of wood pulp by the soda process.

The black liquor, concentrated to a solids content of from about approximately 65% to 75% is delivered to tank 32 through conduit 100, from which it is then fed through the water-cooled pipe 24 into the rear end of the drying drum 10. The concentrated black liquor dried in the drum by the rotation of the drum and the counter-current flow of the gases from the furnace unit C, is discharged therefrom into the feeder unit B. By the above-described action of the screw feeder, the dried material is delivered into the furnace in the form of lumps of a size between about 3 and 4 inches.

The smelt resulting from the burning or calcining of the dried solids delivered to the furnace consists essentially of sodium salts, in molten condition. This smelt is evacuated from the furnace through the opening 78 and spout 79 connected therewith, for delivery to a dissolving tank.

The heat and gases produced by the combustion of the organic matter contained in the dried material delivered to the furnace, pass through passageway 25 into and through the dryer unit A, from which they pass, along with gases evolved in the dryer, through the passageway 18 into the heat recovery unit D.

The temperature of the gases at the outlet 16 of the drying drum may range from about 700° C. to about 1000° C., depending upon the operating conditions, such as the water content of the liquor fed to the dryer, the amount of excess air, and the effectiveness of the hood 15 and seals 19, 20.

As will be apparent, any effort to cool the walls of the smelting furnace tends to reduce the amount of heat and the temperature of the gases evolved by the combustion of the solids of the black liquor, and results in a corresponding reduction in the speed of the combustion reactions which must take place all the way through the smelting furnace and the rotary dryer, and even a little beyond. A large quantity of gaseous organic matter is evolved either by evaporation, dry distillation or cracking of the organic solids, as soon as the liquor enters the dryer, Accordingly, if proper temperatures and air quantities are not maintained all the way from the smelting furnace to the secondary combustion chamber 91, part of the evolved organic matter will not be completely burned. Incompletely burned matter means, as will be understood, that the heat released during the recovery process is substantially decreased, with a consequent reduction in the amount of steam generated in unit D. With the foregoing in view, the temperature in the smelting furnace is maintained as high as possible and no means for cooling the furnace walls is employed, except for such as occurs by cooling ring 73 with water or air.

The aqueous solution of the smelt flowing from furnace 70 may be processed according to conventional systems to obtain so-called green liquor by diluting the same with weak so-called white liquor. The green liquor obtained in this manner may be pumped to the uppermost chamber of a combined causticizing clarifier-washer (not shown) into which burnt lime is also introduced. The calcium carbonate sludge, which usually also contain some sand, passes through a rake and a mud-lock to the next lower chamber, which also receives the white liquor overflow. The white liquor definitively clarified in the second chamber and evacuated therefrom, through a clarifier mantle, by a collecting pipe. In the third or bottom chamber, the residual alkali is washed from the lime mud, and the weak white liquor thus obtained leaves the chamber through a collecting pipe and is used in the dissolver. The lime mud is pumped away from the conical bottom of the clarifier.

Referring to another embodiment of the invention, wherein the method and apparatus thereof are utilized for the treatment of waste liquors from the neutral sulfite process of producing wood pulp, the smelt flowing from the furnace 70 consists mainly of sodium carbonate and sodium sulphide. This smelt may be converted into liquor useful for the digesting of wood chips or the like, by displacing the hydrogen sulphide evolved in the process, with carbon dioxide; burning the hydrogen sulphide to form sulphur dioxide and reacting the latter with the sodium carbonate solution obtained after displacing the hydrogen sulphide.

With respect to the construction and operation of the smelting furnace according to the invention, reference will now be made to several of the principal respects in which the same differs from smelting furnaces heretofore used for the recovery of chemical and heat values in waste liquors of pulp-making processes.

These known forms of smelting furnaces have proved not economically useful either because of the need for frequent major repairs thereto or because of the large amount of heat absorbed for water cooling of the furnace walls. We have found that the area of the furnace walls most susceptible to destruction is localized or confined more or less to that which is adjacent to or surrounds the place where the primary air enters the pot zone of the furnace, while the life of the walls at the upper levels of the furnace is considerably longer. Further, we have found that the life of the walls in the above-mentioned critically susceptible area thereof is substantially improved if the direct stress, temperature gradients, etc., are decreased, as above-described.

Accordingly, one distinct feature of the smelting furnace employed in the practise of the invention, resides in the fact that its upper walls are supported on a water- or air-cooled ring, while the inner lining (75) is the one whose surface is exposed to the physical and chemical actions taking place in the furnace.

If no cooling at all is provided on the critically sensitive areas of the furnace, as in the case of smelting furnaces heretofore used, the temperature rises to a very high level as long as there are practically no means for dissipating the heat conveyed by the burning solids and produced by the primary combustion. These exceedingly hot temperatures speed up the chemical action of the smelt on the bricks of which the furnace walls are built and also render these bricks more sensitive to erosion by the high velocity of the primary air introduced into the furnace in order that the primary combustion may proceed at a sufficiently high rate.

While the cooling of the refractory bricks adjacent the ring 73 of the furnace construction according to the invention, tends to increase the temperature gradient through these bricks, this occurs only on those areas of the pot where the temperature is substantially at a minimum because of the compartively cool primary air introduced adjacent those areas through the water-cooled nozzles 85. Furthermore, by reason of the air- or water-cooled ring 73, the zone of maximum temperature is removed from the zone of maximum erosion.

Moreover, by reason of the effect of the ring 73 in eliminating the direct compressive stress on the lining 75, the cost, frequency, and time required for maintaining the lining at proper operating efficiency are reduced to at least the figure which prevails in the case of the conventional recovery systems. While the inner lining 75 when made of basic refractory bricks is a wear lining, we have found in practice that it is never necessary to replace all the bricks of the lining. Usually, the application of basic refractory material by means of a cement gun to the above-mentioned critically susceptible areas adjacent the water-cooled primary air nozzles 85, suffices very adequately for repair or replacement of worn out areas, in the manner referred to above.

By means of the above-described furnace construction, and particularly if a layer of insulating material is interposed between the refractory bricks and the carbon-steel shell in the upper walls of the furnace, and if the rotary dryer is lined with firebrick, most of the heat is conveyed to the heat recovery unit D. It thus becomes possible to obtain practically the same quantity of steam as is produced in the conventional recovery boilers heretofore used, namely, about four to five kilograms of steam per kilogram of pulp produced in a kraft mill. Some useful warm water is also obtained which emanates from the several water cooled parts.

As already indicated above, it is a distinct advantage of our present invention that the heat recovery boiler 90 requires no special design and may comprise any water-tube boiler. In addition, the danger of explosion is greatly minimized in our system by reason of the location of the boiler at a substantial distance from the hot smelting zone of the furnace 70.

It will be apparent from all of the above that the process and apparatus of the invention provide the described benefits and advantages when utilized for the recovery of chemicals and heat values from waste liquors obtained when producing pulp by any of the conventional chemical or semi-chemical processes of digesting wood or other plant material, as well as when utilized for recovering inorganic chemicals and heat values from other types of waste liquors, and whether or not other fuel such as waste organic solids are mixed with any of such liquors to supplement the heat value of the organic solids content thereof.

Moreover, the recovery system provided by the method and apparatus of the invention requires a much lower investment for its installation than in the case of a conventional recovery unit of the same capacity. Even compared to conventional recovery units having capacities substantially greater than 100 tons per day, the investment required for installation of the system hereof is lower when calculated on the basis of per ton of pulp mill production. Accordingly, the economies afforded by the system hereof provide an important advantage which renders it especially useful in small scale operations, as hereinabove pointed out.

What is claimed is:

1. A method for the recovery of the inorganic chemicals, and for utilizing the heat values of organic compounds, contained in waste liquor obtained in the production of pulp by chemical and semi-chemical digestion of wood and other plant materials, said method consisting essentially of the steps of:
   (a) delivering a stream of said liquor into a drying zone constituted of a rotating cylindrical shell to convert the same into dried solids by contact with the hot gases hereinafter set forth while rotating said shell and regulating the peripheral speed of said shell to control the rate of drying of said liquor therein, said gases passing through said zone in direct contact with and in counter-current flow to the flow of said liquor in said zone;
   (b) delivering said dried solids from said drying zone into a feeding zone for feeding the same into a stationary combustion zone, separate from said drying zone, transforming the dried solids during the movement thereof through said feeding zone into lumps of a predetermined size, discharging said lumps into said combustion zone to form a mound of said lumps therein;
   (c) feeding primary air into said combustion zone below the upper level of said mound to effect combustion of organic compounds and the formation of a smelt of the inorganic material contained in said lumps of said solids, feeding gaseous products of combustion of said organic compounds into and through said drying zone to constitute the hot gases referred to in step (a) above;
   (d) discharging the gaseous products from said drying zone into a heat recovery zone spaced from said combustion zone; and
   (e) utilizing said discharged gaseous products for generating steam in said heat recovery zone.

2. A method as defined in claim 1, and wherein the size of the lumps formed in said feeding zone is varied to control the rate of primary combustion of said lumps.

3. A method as defined in claim 1, wherein said lumps of dried solids discharged from said feeding zone are of a size in the range of from about three to six inches.

4. A method as defined in claim 1, wherein said liquor is fed by gravity from a source of supply thereof into said drying zone.

5. A method as defined in claim 1, wherein prior to its delivery to said drying zone, said liquor is admixed with an inexpensive extraneous waste fuel, whereby to enhance the heat value of the dried solids of said liquor.

6. A method as defined in claim 5, wherein said extraneous fuel is an organic waste material selected from the group consisting of sawdust, tree bark, and pith of sugar cane bagasse.

7. A method as defined in claim 1, wherein said liquor comprises black liquor obtained in the production of pulp by the soda process.

8. A method as defined in claim 1, wherein said liquor comprises liquor obtained in the production of pulp by the neutral sulfite process.

9. A method as defined in claim 1, wherein said liquor comprises liquor obtained in the production of pulp by the acid sulfite process.

10. A method as defined in claim 1, wherein said liquor is a liquor obtained in the production of pulp from sugar cane bagasse, and wherein said liquor is admixed with the pith of sugar cane bagasse.

11. Apparatus for the recovery of inorganic compounds and heat values of organic compounds contained in waste liquors, comprising the combination of a rotary dryer, means for delivering waste liquors to the dryer, a stationary smelting furnace having a combustion zone for burning said dried material discharged from said dryer and for forming a smelt of said inorganic compounds, said furnace having an outlet passageway for combustion gases, means for feeding said dried material from said dryer into the combustion zone of said furnace, said feeding means being provided with variable drive means arranged and operatable to form said dried material into lumps of predetermined size prior to discharging the same into said combustion zone, means for introducing primary combustion air into the combustion zone of said furnace, a steam generating unit spaced from said combustion zone, said dryer being connected to said outlet passageway for receiving said combustion gases and for enabling the same to pass through said dryer in a direction counter-current to the flow of said liquors therein, and said steam generating unit being connected to said dryer to receive, and utilize the heat of, said combustion gases after passage thereof through said dryer.

12. Apparatus as defined in claim 11, wherein said feeding means comprises a cylindrical shell having a helical type screw blade rotatable therein, and a variable speed drive for said blade.

13. Apparatus as defined in claim 12, having means for water-cooling said shell.

14. Apparatus as defined in claim 11, and having means for longitudinally reciprocating said feeding means whereby to discharge said lumps of dried material at desired locations transverse to the vertical axis of the combustion zone of said furnace.

15. Apparatus as defined in claim 11, wherein said means for introducing primary combustion air into said combustion zone is water-cooled.

16. Apparatus as defined in claim 15, wherein the wall of said furnace extending above the combustion zone thereof is supported on a cooling ring disposed adjacent said water-cooled means for introducing said primary combustion air.

17. Apparatus as defined in claim 16, wherein said supporting ring is air-cooled.

18. Apparatus as defined in claim 17, wherein the preheated air resulting from the coling action of said ring is utilized as primary or second combustion air in said furnace.

19. A furnace structure for effecting combustion of organic compounds and production of a smelt of inorganic compounds contained in dried solids of waste liquors, said structure comprising:
- (a) a relatively elongated vertical wall of cylindrical outline and consisting essentially of clay firebricks retained in place by an outer cylindrical shell of steel;
- (b) a hollow cooling ring supported in said wall along the primary combustion zone of the furnace adjacent the bottom thereof and supporting the upper portion of said wall;
- (c) water-cooled means for introducing primary combustion air into said primary combustion zone at a point adjacent said cooling ring;
- (d) a refractory lining for the lower end of said wall, said lining extending upwardly from the bottom of said wall and terminating adjacent said cooling ring and above said primary combustion air-introduction means;
- (e) an opening at the bottom of said wall for discharging smelt from the furnace; and
- (f) a passageway at the upper end of said wall for discharging gaseous products of combustion from the furnace.

20. A furnace structure as defined in claim 19, and having a water-cooled top wall, said top wall being supported for vertical movement in response to excessive expansive forces which may occur in said furnace.

21. A feeding device for the purpose set forth, comprising:
- (a) a hollow wall cylindrical shell having an inlet opening at one end thereof and an outlet opening at the opposite end thereof;
- (b) a rotatable shaft extending longitudinally through said shell;
- (c) a helical screw fixed to said shaft;
- (d) means connected with said shaft for driving the same at a controlled variable speed;
- (e) a bar fixed to each of the flights of said screw on opposite surfaces thereof, said bars being radially spaced with relation to each other;
- (f) spaced bars fixed to the inner wall surface of said shell to extend radially inward therefrom toward said shaft externally of the path of said flights;
- (g) spaced bars, fixed to said shaft to extend radially outward therefrom toward said wall surface and disposed intermediate said last-named bars; and
- (h) means for circulating a cooling medium through said hollow wall of the shell.

22. The combination with a furnace for effecting combustion of organic compounds and production of a smelt of inorganic compounds contained in dried solids of waste liquors, of means for feeding said dried solids into said furnace in the form of lumps of a size controlled to permit desired distribution of primary combustion air through a mound of said lumps in the pot zone of said furnace, said feeding means consisting essentially of the feeding device defined in claim 21 having its said outlet opening projecting into the interior of said furnace through an opening formed in a vertical wall thereof.

23. The combintion defined in claim 22, having means connected to said shell to move the same axially thereof for varying the position of said outlet opening of the shell relative to the vertical axis of the furnace.

24. The combination with a feeding device as defined in claim 21, of a rotary cylindrical dryer for drying waste liquors, said cylinder being open at one end thereof for discharge of dried material therefrom, said cylinder being disposed above said shell and having its axis inclined slightly upward, from said open end thereof, with respect to the axis of rotation of said shell of the feeding device, said open end of the cylinder being formed by an annular flange extending radially inward of the cylinder, and said flange having a series of rakes affixed to the outer surface thereof, each of said rakes comprising a plurality of intersecting plates configured and dimensioned to push dried material from said one end of said cylinder into said inlet opening of said shell of the feeding device.

References Cited

UNITED STATES PATENTS

| | | | |
|---|---|---|---|
| 429,417 | 6/1890 | Burgess | 110—7 |
| 1,137,779 | 5/1915 | Moore | 110—75 |
| 1,746,350 | 2/1930 | Hayn | 110—110 |
| 1,910,724 | 5/1933 | Unden | 122—6.6 |
| 1,933,255 | 10/1933 | Goodell | 110—8 X |
| 1,974,231 | 9/1934 | Bighouse | 110—15 |
| 2,228,840 | 1/1941 | Mittendorf | 110—110 X |
| 2,946,572 | 7/1960 | Annis | 110—110 X |

FREDERICK L. MATTESON, JR., *Primary Examiner.*

H. B. RAMEY, *Assistant Examiner.*